UNITED STATES PATENT OFFICE.

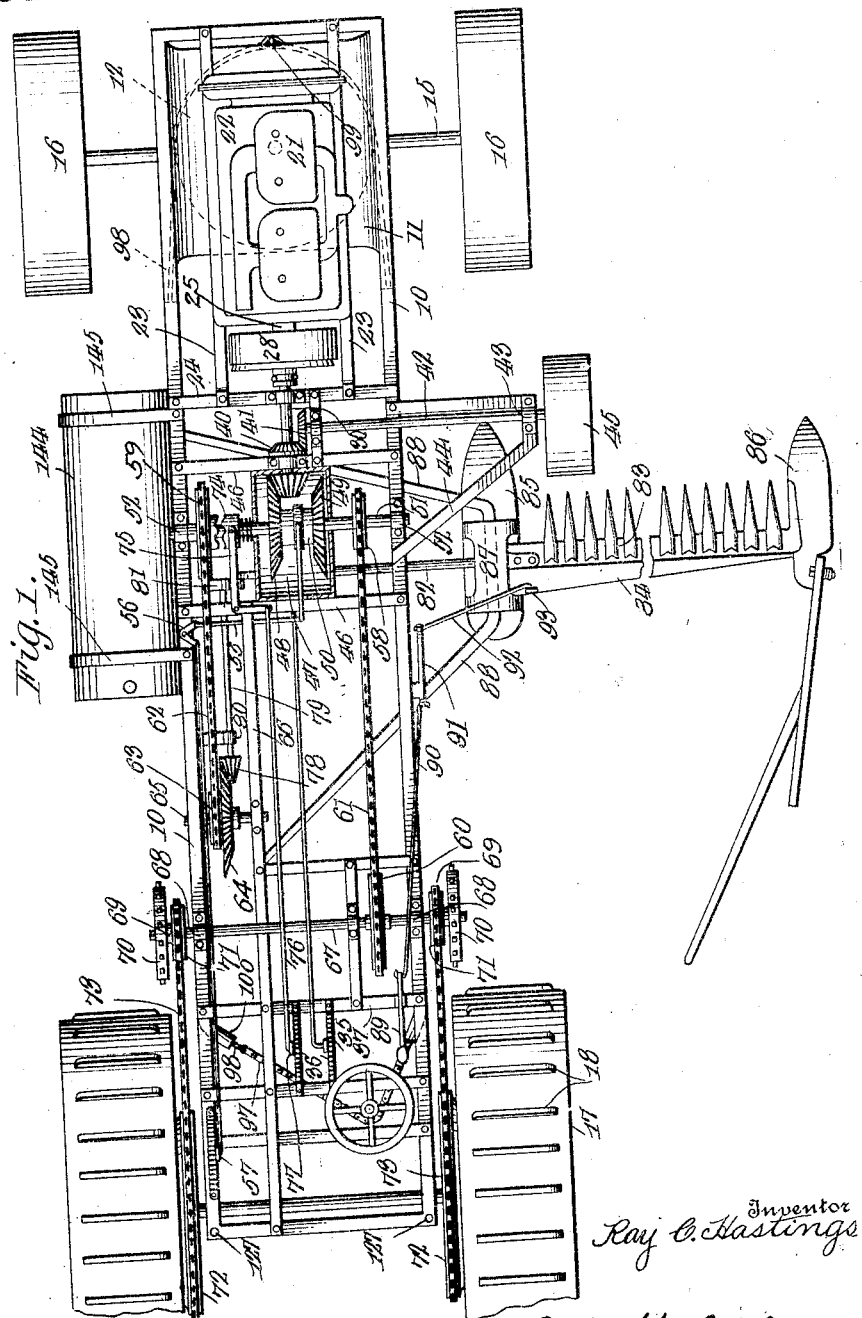

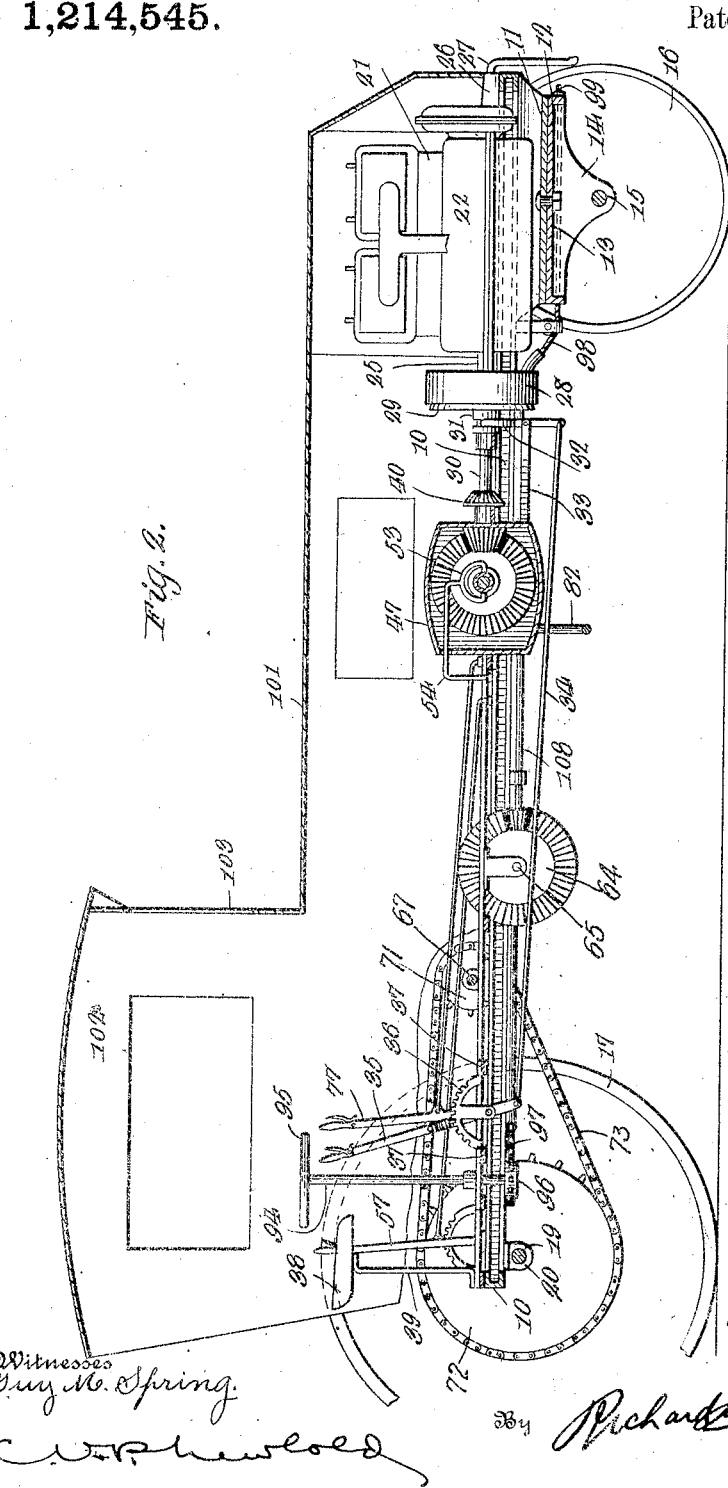

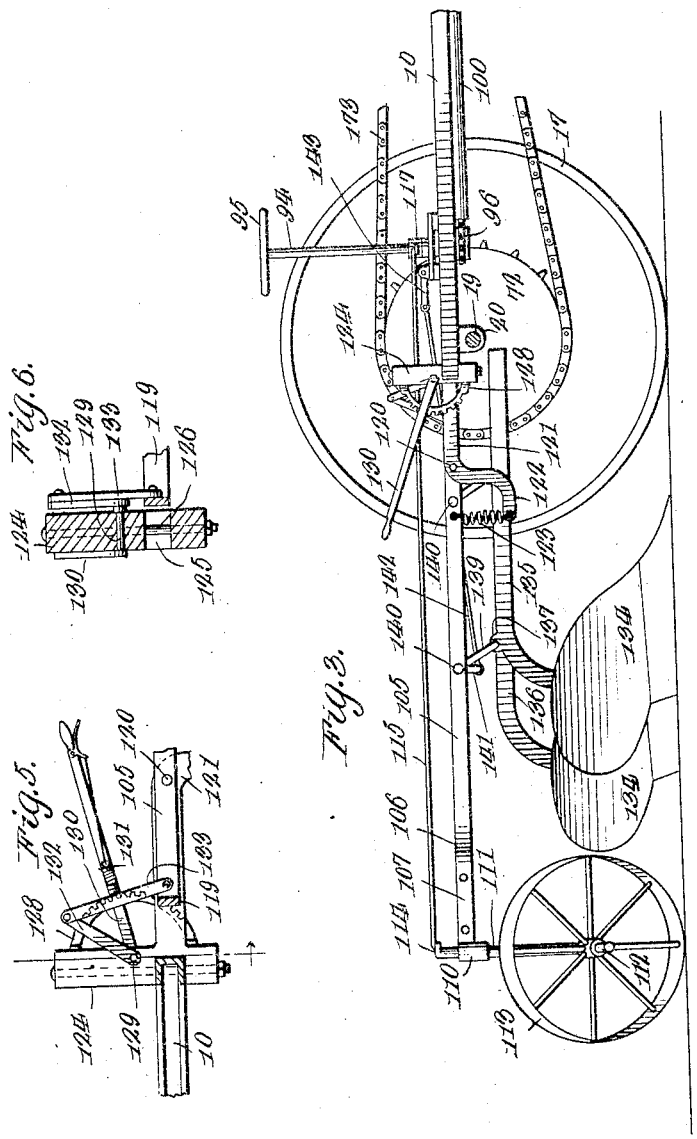

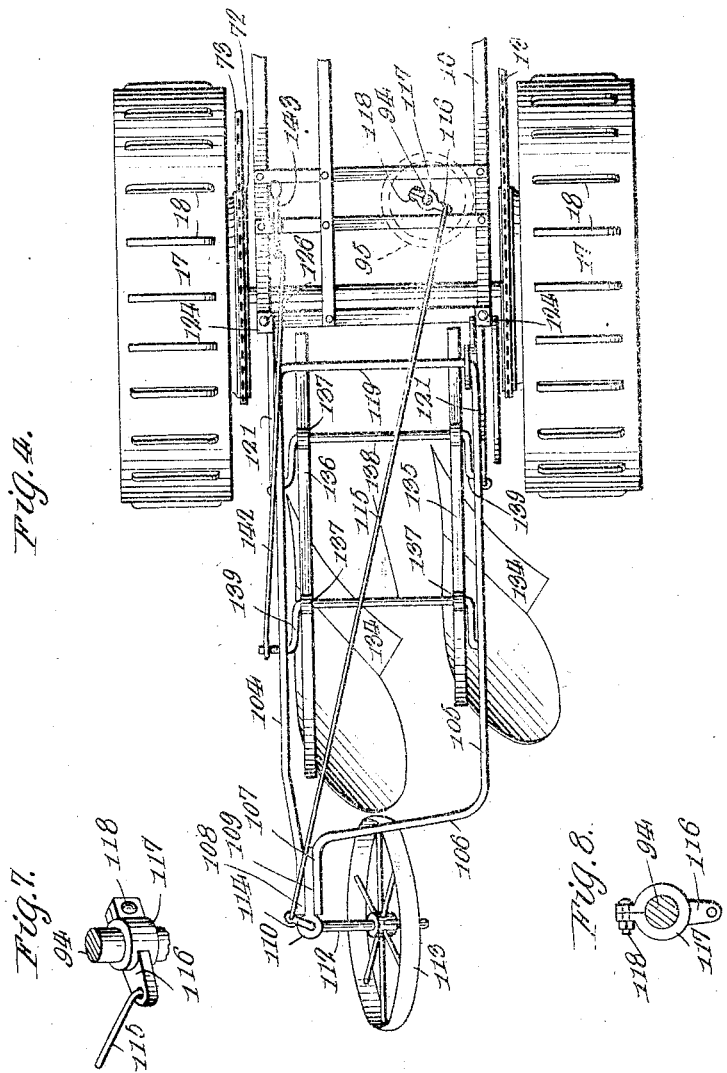

RAY C. HASTINGS, OF WICHITA, KANSAS.

GENERAL-PURPOSE FARM-TRACTOR.

1,214,545.     Specification of Letters Patent.     Patented Feb. 6, 1917.

Application filed April 8, 1915. Serial No. 20,022.

*To all whom it may concern:*

Be it known that I, RAY C. HASTINGS, a citizen of the United States, residing at Wichita, in the county of Sedgwick and State of Kansas, have invented certain new and useful Improvements in General-Purpose Farm-Tractors, of which the following is a specification.

This invention relates to tractors, and more particularly relates to a tractor adapted to have a variety of uses on a farm as a motive power for the various agricultural implements both movable and stationary.

As a principal object, it is contemplated by this invention to provide a general purpose farm tractor which shall be particularly adapted for the propulsion of the agricultural machinery during the operations of mowing, plowing and the like while being also adapted to act as a stationary engine for driving churns, drills, sawing machinery or the like.

A more specific object of equal importance is to provide a tractor of the type set forth which shall be particularly fitted to have coupled thereto frames in which agricultural implements may be mounted and drawn by the tractor while a supplemental object of this invention includes means for steering the tractor and the trailing frame simultaneously.

An object of equally specific importance is to provide means adapted to be carried by a tractor of the type set forth which will support mowers, rakes or the like machines laterally of the tractor for locomotion therewith while the tractor engine is at the same time employed to drive the internal mechanism of the carried implements.

The above and additional objects which will become apparent as this explanatory description proceeds, are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is a plan view of the tractor chassis with the body removed therefrom and showing the attachment of a mower thereto, Fig. 2 is a vertical sectional view through the tractor, Fig. 3 is a fragmentary elevational view of the rear end of the tractor showing the manner of coupling a trailer frame thereto, Fig. 4 is a plan view of the subject-matter of Fig. 3, Figs. 5 and 6 are details of the mentioned coupling means, and Figs. 7 and 8 are details of the common steering means between the tractor and such trailer.

Referring now to the drawings, and more particularly to Figs. 1 and 2 where the tractor is illustrated as a whole, it will be seen that the chassis thereof includes the body frame 10 rectangular in shape and formed from the usual U-shaped framing members common in chassis construction. The forward end of the chassis frame has formed therewith the transverse plate 11 which is mounted over a "fifth wheel" 12 which in the present instance includes the metallic plate 13 formed at diametrical extremities with the integral depending ears 14, the latter being apertured to receive the front axle 15 of the tractor, at the extremities of which axle are supported the forward wheels 16. Rear wheels 17 constructed with a grip-tread by means of the perimetrally spaced cleats 18 are independently mounted upon an axle 19 which has its extremities journaled in brackets 20 suitably supported by the rear of the frame 10.

Motive power for the tractor may be preferably furnished by an internal combustion engine such as indicated by the numeral 21, the crank casing 22 of which is supported upon longitudinal framing members 23 which together with the transverse brace 24 and the forward end of the frame 10 form a suitable bed for the engine. This engine is preferably of the heavy duty type developing a comparatively low horse-power in order to furnish strength rather than speed. The engine shaft 25 extends through the crank casing 22 and into a forward bearing 26 where initial rotation may be imparted to it through the medium of the usual starting handle 27. The opposite extremity of this shaft 25 supports the inclosing member 28 of a friction clutch, which is adapted to engage in the customary manner with the coned male clutch member 29 under proper actuation of the latter. The member 29 is splined upon the drive shaft 30 and is provided with a hub 31 which is peripherally channeled to receive a yoke member 32 pivotally mounted at the extremities of suitable supporting arms 33 and connected by a link 34 to an operating lever 35 which has the usual adjustable locking connections with a segment arm 36 supported by transverse framing members 37 adjacent a driver's seat 38, which latter is mounted by any suitable means 39 at the extreme rear of the chassis 10. The drive shaft 30 is journaled in suitable bearings and carries a drive gear 40 which is adapted to mesh with a similar gear 41 mounted upon the extremity of a countershaft 42 which projects laterally of the chassis 10 and is supported at its outer end in a bearing 43 carried by suitable frame arms 44 which extend outwardly a sufficient distance from the chassis to permit the fly wheel 45 which is keyed to the outer extremity of the shaft 42 to be removed beyond the line of the wheels 16 and 17 since this fly wheel is also adapted to serve the functions of a driving pulley for stationary machinery about a farm and may be equipped with a drive belt (not shown) for this purpose. Additional transverse frame members 46 serve to support centrally of the chassis a transmission case 47 in which are mounted the oppositely positioned driving and reverse gears 48 and 49 respectively which are commonly secured upon a collar 50 splinedly mounted upon a countershaft 51 journaled in suitable bearings 52 upon the chassis frame 10. Movement of this collar is governed by means of a yoke 53 dependent from an arm 54 slidably entering the transmission case 47 and in turn connected by link means 55 to a bell crank 56 pivoted to the frame of the chassis and controlled by proper manual manipulation of the clutch lever 57 also mounted in the usual manner previously mentioned in the case of the lever 35 at the rear of the chassis adjacent the driver's seat.

On opposite sides of the transmission case 47 there are mounted the sprockets 58 and 59 respectively fixed to and loose upon the countershaft 51, the former serving to drive the main drive sprocket 60 through the medium of a suitable chain 61 while the latter has similar chain connections 62 to a sprocket 63 carried together with a gear 64 upon a stub shaft 65 which has its ends journaled in one of the side members of the chassis 10 and a longitudinal framing member 66. The first named of these latter two sprockets, the sprocket 60, is carried upon the countershaft 67 which projects laterally of the chassis 10 through opposite bearings 68 and has splined upon its outer extremities the two speed sprocket members 69 which are formed together and may be interchangeably mounted on the extremities of this counter-shaft 67 in order to determine whether the large or small sprocket of each member, as denoted by the numerals 70 and 71 respectively are to be operatively engaged with the sprockets 72 whereby the rear wheels 17 are adapted to be driven, chains 73 serving the purpose of transmission mediums.

Transmission of power to the second of the sprockets connected to the countershaft 51, the sprocket 63, is determined by the clutch members 74 formed with mating rosette faces, one of the members being slidably controlled by a bell crank yoke 75 which is in turn operated through the medium of a link 76 from the driver's lever 77 also having adjustable locking connections with a segment 36 mounted upon the transverse frame members 37 in the manner illustrated in both Figs. 1 and 2. A drive pinion 78 is carried at the extremity of a pitman shaft 79, the latter being supported in side bearings 80 carried at appropriate points of the chassis 10 to permit this pinion to mesh with the previously mentioned drive gear 69. The other extremity of the shaft 79 carries a crank 81 to which is connected a pitman 82 whereby the cutter bar 83 of a mowing attachment designated as a whole by the numeral 84 may be operated in the usual manner.

The mower 84 includes the usual shoes 85 and 86 the former being hingedly supported as denoted by the numeral 87 in what may be termed the bight portion of supporting arms 88 which are suitably connected to longitudinal members of the chassis 10 or the frame brace 66, as may seem appropriate, the mower being preferably of the vertical lift variety. Means for removing the mower 84 from its operative position includes the foot pedal 89 which is connected by a link 90 to a triangle or other suitably pivoted means 91 and which in turn is connected by the operating link 92 to an ear 93 formed upon the mower frame so that depression of this foot pedal will rotate the triangle and will consequently raise the mower 84 from the position shown in Fig. 1.

The steering means contemplated by this invention include the vertical positioning of the usual rotatable steering post 94 which may be topped preferably by the operator's hand wheel 95. The steering rod extends below the center line of the chassis 10 and has secured at this extremity a sprocket 96 which is adapted to engage the bight portion of a length of chain 97, the extremities of this chain being secured to a cable 98 which is carried forwardly to embrace the fifth wheel structure 12 whereby the forward wheels of the tractor are mounted. The circular plate 13 is preferably formed with an annular flange adapted to be engaged by this cable 98, the bight of which is secured thereto as indicated by the numeral 99 at the forward extremity of a longitudinal diameter of the plate 13 so that rotation of the hand wheel 95 transmitted to the chain 97 through the lower sprocket 96 will result in a similar rotation of the wheel 13 and a consequent shifting of the direction of the tractor through the angular position of the front axle and wheels. Pipes 100 depend from the chassis 10 to provide ways on each side of the tractor frame wherein the cable 98 can travel without interference or wear against other parts of the mechanism.

The foregoing describes in detail the mechanism of the preferred farm tractor of this invention whereby attached agricultural implements are both propelled and operated. It is to be understood, of course, that a suitable hood structure such as designated as a whole by the numeral 101 in Fig. 2 may be employed to house this mechanism while an operator's cab 102 forms the body of the vehicle, such cab inclosing the driver's seat 38 and adjacent operating mechanism, and opening to the rear, being also formed with suitable windows 103 from which the driver may properly direct the operation of the machines entrusted to his care. It, accordingly, now remains but to describe the construction of the preferred type of trailer which the tractor is adapted to drag together with the particular coupling means therebetween provided by this invention. For this purpose, reference will be had to Figs. 3 and 4 respectively, in which are illustrated views showing a trailer attached to the rear end of the tractor frame and since this trailer is suited for the support of plows, it has been illustrated in this connection, although it will be readily understood that harrows, listers, ground pulverizers and the like may be readily hitched on to the tractor in place of the plow trailer. The trailer illustrated will be seen to include opposite frame members 104 and 105, the latter being bent to form the integral rear frame member 106 and being again subsequently bent as at 107 to coact with the alinedly bent portion 108 of the first named member, these bent extremities inclosing therebetween a plate 109 which has formed thereupon a vertical bracket 110 in which the rear wheel standard 111 is supported, such standard being bent at its lower extremity at a suitable angle to form an axle for the wheel 113 which is inclinedly mounted with both horizontal and vertical planes in the customary manner as illustrated in both of the figures under perusal. The upper extremity of the standard 111 is formed with the extension 114 providing a crank handle for actuating the standard to steer the wheel 113, such crank being linked by appropriate means 115 to an extension 116 formed upon a split bracket denoted as a whole by the numeral 117 and removably secured by means 118 to the previously mentioned steering post 94 of the tractor frame so that simultaneous steering of the trailer with the tractor is thus assured. At their forward extremities the side frame members 104 and 105 are connected by a mutually integral transverse framing portion 119 and the entire frame is pivoted as shown at 120 to frame members 121 of the coupling means whereby this trailer is connected to the tractor of the foregoing description. At their outer extremities these side frames 121 are bent downwardly and then successively again into the horizontal position shown at 122 and have a contractile spring 123 securely interposed therebetween and the adjacent portion of each of the side frame members 104 and 105 serving to yieldably mount the pivoted frame of the trailer.

The coupling means for the auxiliary side frames 121 include the vertical securing posts 124, each of which is formed with a mortise or cut away portion 125 of such size as to receive one of the rear corners of the tractor chassis 10 therein while a vertical bolt 126 passes through each securing post and an aperture 127 in the respective corners of the chassis to which these posts are to be removably secured. It will readily be seen that a means is thus offered whereby the plow trailer may be readily attached or disengaged to the tractor and it is also aimed to provide by this invention means for regulating the position of this trailer frame as may be required. A toothed segment 128 is supported by one of the posts 124 which has also pivoted thereto as at 129 a lever 130 provided with means 131 adapted to coact in the common adjustable locking manner with the segment 128. This lever is constructed after the fashion of a bell crank lever being formed with an arm 132 but at a small angle to the lever and not at the usual right angle of a bell crank. The reason for this is apparent upon reference to Fig. 5 where it will be seen that this arm 132 is connected by a controlling link 133 with the extremity of the trailer frame side 105 and it will be apparent that movement of the lever downward will result in an elevation of the rearward portion of the trailer frame, since this latter is on the opposite side of the pivot 120, as the portion connected to by the link 133, while a reversal of direction in moving the lever will lower the rearward portion of such trailer frame. The plows or listers 134 may be supported by this frame in gangs and as has been illustrated are adapted to have their respective beams 135 and 136 formed with bearing ears 137 in which are received the crank shafts 138, each of which shafts is formed with a crank extremity 139 and is subsequently pivotally mounted as indicated by the numerals 140 in the opposite trailer side frames 104 and 105. As an operating means to direct simultaneous movement of each of these shafts, one of the same is formed with a normally vertical crank extension 141 and is linked by means 142 to a foot pedal 143 mounted upon an appropriate frame member of the tractor chassis 10 for controlling in the obvious manner the engagement of the plows or other devices carried by the crank shafts 138.

The foregoing concludes the description of the particular tractor and type of trailer therefor which has been designed for employment in farming work of every character by the present invention and it is thought that no detailed description of the operation is necessary. A fuel tank 144 may be supported by braces 145 laterally of the truck 10 as indicated in Fig. 1 while the usual means of radiation, cooling, ignition, and control are provided for the heavy duty tractor engine 21. It should be particularly noted that the driver is provided with means directly at hand for controlling all movements of the vehicle and of the trailer since the arrangement of controlling means for this latter is such as to give the driver of the tractor immediate access thereto, due to the arrangement of his seat at that portion of the tractor to which the trailer connects.

While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. The combination with a tractor, of a trailer, and auxiliary side frames rigidly but removably connected to the rear of said tractor, and resiliently pivoted to the front of said trailer for connecting the latter to the former, and means supported on the tractor frame for raising and lowering the rear of the trailer.

2. The combination with a tractor having a chassis, of a trailer having a frame alined therewith, auxiliary side frames pivoted to the front of said trailer frame for removable securement to the rear portion of said tractor chassis, and lever means on one of said auxiliary frames connected to the trailer frame for raising and lowering the rear thereof.

3. The combination with a tractor having a wheeled chassis, of a trailer having a frame alined with said chassis, a pair of auxiliary side frames pivotally connected to forward portions of said trailer frame, vertical securing posts carried by said side frames, and means for removably securing said posts to said tractor chassis.

4. The combination with a tractor having a wheeled chassis, of a trailer having a frame alined with said chassis, auxiliary side frames pivoted to the trailer frame and adapted to be removably secured to the rear portion of said tractor chassis in supporting the forward portion of said trailer frame, and a wheel mounted to support the rear portion of said trailer frame, and means for raising and lowering the rear of the trailer frame.

5. The combination with a tractor having a wheeled chassis, of a trailer having a frame alined with said chassis, auxiliary side plates for linking said trailer to said tractor, and including vertical steering posts adapted to removably embrace rear corners of said tractor chassis and pivotally and yieldably supporting the forward portion of said trailer frame, and a plow wheel for supporting the rear extremity of said frame.

6. The combination with a tractor having a wheeled chassis, of a trailer having a frame alined with the tractor chassis, auxiliary side plates pivotally connected to the forward portion of said frame, vertical steering posts carried at one extremity of each side plate and formed with a mortise for removably embracing rear corners of said tractor chassis, the opposite extremity of each of said plates being spaced from said tractor frame and yieldably connected thereto.

7. The combination with a tractor having a wheeled chassis, of a trailer, side pieces forming the frame of said trailer, and integrally connected at the forward portion thereof, the opposite extremity of said side pieces being bent together at one corner of the frame to support a standard, a wheel mounted upon said standard to support the rear end of said frame, side plates pivoted to support the front portion thereof, vertical posts carried by said side plates to link the same to said tractor chassis, and resilient means interposed between the inner extremities of said side plates and said trailer frame for yieldably supporting the latter.

8. The combination with a tractor having a wheeled chassis, of a trailer, side pieces forming the frame of said trailer, and integrally connected at the forward portion thereof, the opposite extremity of said side pieces being bent together at one corner of the frame to support a standard, a wheel mounted upon said standard to support the end of said frame, and side plates pivoted to support the front portion thereof, vertical posts carried by said side plates to link the same to said tractor chassis, resilient means interposed between the inner extremities of said side plates and said trailer frame, and a bell crank lever pivoted to one of said vertical posts and linked to the forward portion of said frame for adjustably maintaining the latter.

9. In combination, a tractor including a chassis, drive wheels supporting the rear of said chassis, steering wheels supporting the front of said chassis, a trailer frame including yieldably mounted side plates removably secured to the rear of said tractor chassis, a bearing carried rearwardly by said frame, a standard supported in said bearing and mounting a steering wheel for said trailer, and means operable from said tractor and connected to the respective steering wheels to guide both vehicles simultaneously.

10. In combination, a tractor including a chassis, drive wheels supporting said chassis, a plate swiveled to the forward portion of said chassis, steering wheels mounted by said plate, a steering post supported by said chassis, and connected with said plate, a trailer to be dragged by said tractor including yieldably mounted side plates removably linking the trailer to the rear of said tractor chassis, a rear steering wheel for said trailer, and connections therebetween and said tractor steering post.

11. In combination with a tractor having a chassis, drive wheels supporting the rearward portion of said chassis, a plate swiveled forwardly of said chassis, downturned ears formed thereon, steering wheels journaled in said ears, a steering post supported by said chassis, a steering cable rotatably connecting said post with said swivel plate, guide supports isolating said steering cable from the remainder of the tractor mechanism, a trailer for said tractor including side frames rearwardly connected to support a steering wheel for said trailer, auxiliary side frames pivotally and yieldably connected to the forward portions of first said frame, vertical linking posts carried by said auxiliary frames for removable securement to the rear of said chassis, and link means extending from said chassis steering post to said trailer steering wheel for simultaneously steering the latter with said chassis steering wheel.

12. The combination with a tractor including a chassis, drive wheels supporting the rear of said chassis, a plate swiveled forwardly of said chassis, steering wheels supported by said plate, an engine, a drive shaft operated by said engine, a countershaft projecting laterally from said chassis and operatively connected with said drive shaft to act as a fly wheel pulley, a second countershaft operated as a transmission shaft, a drive countershaft and a stub shaft both driven from said second countershaft, the former operating said drive wheels, laterally projecting frame arms for said tractor, a mechanism adapted to be propelled by said tractor and pivotally mounted upon said arms, means for driving said mechanism from said stub shaft, a trailer adapted to be drawn by said tractor, a steering wheel for said trailer, and means for simultaneously steering said trailer and said chassis steering wheels.

In testimony whereof I affix my signature in presence of two witnesses.

RAY C. HASTINGS.

Witnesses:
  GERTHA FUSMAN,
  JESSIE WILLIAMS.